US009656558B2

(12) United States Patent
Weber et al.

(10) Patent No.: US 9,656,558 B2
(45) Date of Patent: May 23, 2017

(54) CHARGING DEVICE FOR AN ELECTRIC ENERGY STORAGE DEVICE IN A MOTOR VEHICLE

(71) Applicant: Bayerische Motoren Werke Aktiengesellschaft, Munich (DE)

(72) Inventors: Robert Weber, Schliersee (DE); Torsten Herzog, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 731 days.

(21) Appl. No.: 13/956,422

(22) Filed: Aug. 1, 2013

(65) Prior Publication Data

US 2013/0314039 A1 Nov. 28, 2013

Related U.S. Application Data

(63) Continuation of application No. PCT/EP2012/051455, filed on Jan. 30, 2012.

(30) Foreign Application Priority Data

Feb. 2, 2011 (DE) .................. 10 2011 003 543

(51) Int. Cl.
*B60L 11/18* (2006.01)
*H02J 7/02* (2016.01)
(Continued)

(52) U.S. Cl.
CPC ......... *B60L 11/1811* (2013.01); *B60L 11/182* (2013.01); *B60L 11/185* (2013.01);
(Continued)

(58) Field of Classification Search
CPC ....... H02J 7/0055; H02J 3/38; Y10T 307/658; Y10T 307/505; Y10T 307/511; Y10T 307/50
(Continued)

(56) References Cited

U.S. PATENT DOCUMENTS

| 5,202,617 A | 4/1993 | Nor |
| 6,104,162 A * | 8/2000 | Sainsbury ............. H02J 7/0057 320/107 |

(Continued)

FOREIGN PATENT DOCUMENTS

| EP | 0 116 925 A2 | 8/1984 |
| EP | 0 610 258 B1 | 3/1997 |

(Continued)

OTHER PUBLICATIONS

English Machine Translation of WO 2010/127783A1.*
(Continued)

*Primary Examiner* — Richard Isla Rodas
*Assistant Examiner* — Manuel Hernandez
(74) *Attorney, Agent, or Firm* — Crowell & Moring LLP

(57) ABSTRACT

A charging device is provided for a motor vehicle. The motor vehicle is equipped with an electric energy storage device, a DC-DC converter as well as a first hard-wired interface to a first external AC network for charging the electric energy storage device and a second inductive interface to a second external AC network for charging the electric energy storage device of the vehicle. The output power of the DC-DC converter is used as the charging power of the electric energy storage device. The input of the DC-DC converter can be supplied with electric power over the first and second interfaces.

3 Claims, 1 Drawing Sheet

(51) Int. Cl.
*H02J 5/00* (2016.01)
*H02J 7/00* (2006.01)

(52) U.S. Cl.
CPC .......... *B60L 11/1816* (2013.01); *H02J 5/005* (2013.01); *H02J 7/0055* (2013.01); *H02J 7/022* (2013.01); *H02J 7/025* (2013.01); *H02J 2007/0059* (2013.01); *Y02T 10/7005* (2013.01); *Y02T 10/7072* (2013.01); *Y02T 90/121* (2013.01); *Y02T 90/122* (2013.01); *Y02T 90/128* (2013.01); *Y02T 90/14* (2013.01)

(58) Field of Classification Search
USPC ......................................................... 320/109
See application file for complete search history.

(56) References Cited

U.S. PATENT DOCUMENTS

| | | | | |
|---|---|---|---|---|
| 2004/0125618 | A1* | 7/2004 | De Rooij | H02J 1/102 363/17 |
| 2012/0043807 | A1* | 2/2012 | Ichikawa | B60L 11/1816 307/9.1 |
| 2012/0181990 | A1* | 7/2012 | Asakura | B60L 11/1811 320/137 |
| 2012/0306439 | A1* | 12/2012 | Ichikawa | B60L 11/123 320/108 |
| 2014/0049113 | A1* | 2/2014 | Choe | H02J 3/02 307/66 |
| 2014/0225432 | A1* | 8/2014 | Geyer | H02M 1/10 307/10.1 |
| 2014/0319911 | A1* | 10/2014 | Alexander | H02J 7/35 307/22 |
| 2015/0115713 | A1* | 4/2015 | Kim | H02M 3/33576 307/23 |

FOREIGN PATENT DOCUMENTS

| | | |
|---|---|---|
| WO | WO 98/32209 A1 | 7/1998 |
| WO | WO 2010/060720 A2 | 6/2010 |
| WO | WO 2010/127783 A1 | 11/2010 |
| WO | WO 2010/131348 A1 | 11/2010 |

OTHER PUBLICATIONS

German Search Report dated May 2, 2012 w/ partial English translation (ten (10) pages).
International Preliminary Report on Patentability (PCT/IB/373), including Written Opinion (PCT/ISA/237) dated Aug. 6, 2013 (Five (5) pages).
International Search Report dated Aug. 31, 2012 (Three (3) pages).

* cited by examiner

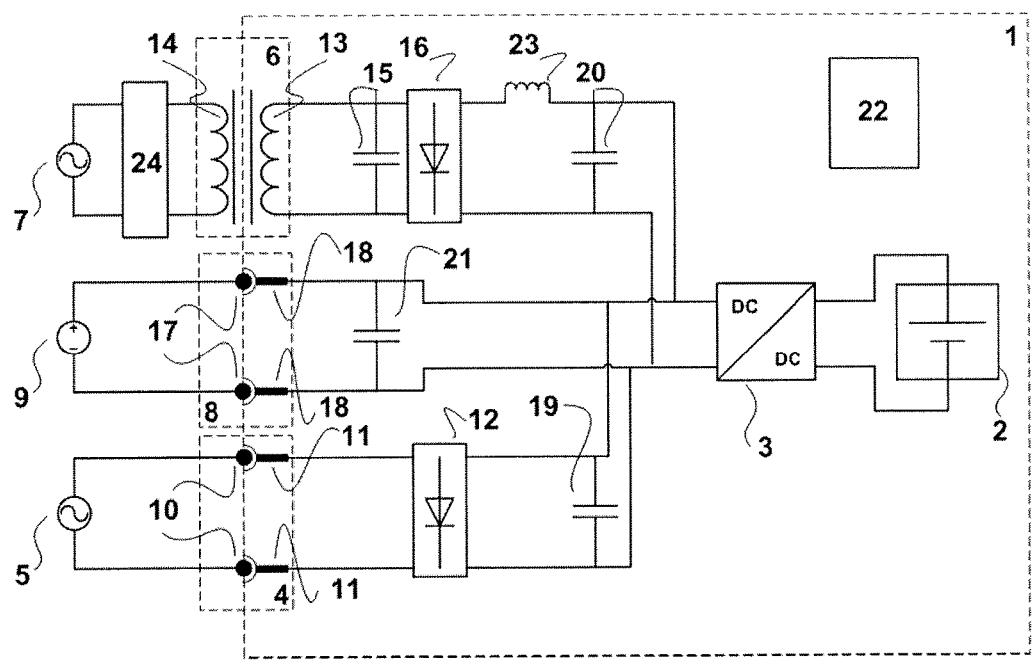

CHARGING DEVICE FOR AN ELECTRIC ENERGY STORAGE DEVICE IN A MOTOR VEHICLE

CROSS REFERENCE TO RELATED APPLICATIONS

This application is a continuation of PCT International Application No. PCT/EP2012/051455, filed Jan. 30, 2012, which claims priority under 35 U.S.C. §119 from German Patent Application No. DE 10 2011 003 543.5, filed Feb. 2, 2011, the entire disclosures of which are expressly incorporated by reference herein.

BACKGROUND AND SUMMARY OF THE INVENTION

The invention relates to a charging device for a motor vehicle, wherein the motor vehicle is provided with an electric energy storage device, a DC-DC converter as well as a first hard-wired interface to a first external AC network for charging the electric energy storage device.

The basis of vehicle concepts that both conserve resources and are also climate and environmentally friendly is the electrification of the drive in modern motor vehicles in the form of hybrid and electric vehicles. The main component of an electrified drive train is a high capacity electric energy storage device. Based on the current development, secondary batteries in lithium ion technology at a voltage level in the high voltage range are available for such an electric energy storage device. In the case of plug-in hybrid vehicles, which are also called socket hybrid vehicles, and in the case of solely electric vehicles, the electric energy storage device is charged not only with the electric power generated in the vehicle, but also with electric power from external sources. The external charging can be carried out conductively or inductively. In the case of the conductive charging technology, the electric charging power is transferred in a hard-wired fashion through a conductor line. In the case of the inductive charging technology, the charging power is transferred by means of electromagnetic induction while the vehicle is moving.

When designing the architecture of the automotive electrical system, the external charging infrastructure has to be taken into consideration. This requirement is apparent from the prior art. EP 0 116 925 A2 describes an on-board battery charging device, in order to charge the battery of an electric vehicle from an external AC network while the vehicle is in a stationary mode. EP 0 610 258 B1 explains a schematic architecture of the automotive electrical system for charging the battery of an electric vehicle at a DC charging station. The principle of inductive charging of a battery of an electric vehicle while the vehicle is moving is described in U.S. Pat. No. 5,311,973 A.

The object of the present invention is to provide an improved charging device for an electric energy storage device in a motor vehicle.

This and other objects are achieved by a charging device for an electric energy storage device in a motor vehicle equipped with a DC-DC converter as well as a first hard-wired interface to a first external AC network for charging the electric energy storage device. The charging device has a second inductive interface to a second external AC network for charging the electric energy storage device of the vehicle. The output power of the DC-DC converter is used as the charging power of the electric energy storage device; and the input of the DC-DC converter can be supplied with electric power over the first and second interface.

It is a particular advantage of the present invention that the electric energy storage device can be charged over the first interface and/or the second interface when the motor vehicle is in the stationary mode. The first interface and the second interface have a common connection to the DC-DC converter for a simultaneous charging operation. The electric energy storage device can also be charged in the stationary mode, if only the first external AC network (hereinafter referred to as the AC charging) or only the second external AC network (hereinafter referred to as inductive charging) is available.

Such an approach offers the particular advantage of a cost effective architecture of the automotive electrical system having only one DC-DC converter that adjusts the charging voltage at the energy storage device. The electric power is fed to the power input of the DC-DC converter in three charging modes (AC charging, inductive charging, simultaneous AC and inductive charging).

Furthermore, there is an additional advantage of the invention in drive mode. The charging device allows the battery to be charged even when the vehicle is running. In this case, the energy storage device of the vehicle is charged over the second interface, i.e. the inductive interface, because a power transfer via electromagnetic induction takes place even while the vehicle is moving.

According to a preferred embodiment of the invention, the charging device has a third hard-wired interface to an external direct voltage source for charging the electric energy storage device. The input of the DC-DC converter can be supplied with electric power over the third interface.

Within the framework of this embodiment, additional charging modes can be implemented with the DC-DC converter located upstream of the secondary battery. When the vehicle is in the stationary mode, this configuration of the charging device allows the energy storage device to be charged over the third interface at a direct voltage source, such as a DC charging station or a DC station (hereinafter referred to as DC charging).

With the charging device, a DC charging operation can be simultaneously combined with an AC charging operation. An additional combination consists of DC charging with simultaneous inductive charging. The DC charging can also be conducted simultaneously with AC charging and inductive charging, so that the DC-DC converter is provided with electric power simultaneously over the first, second and third interfaces for charging the battery.

According to a further development of the invention, the DC-DC converter of the charging device is configured such that the lower limit of the nominal range of the input power of the DC-DC converter corresponds to at least the power that constitutes the lowest power from the set of the three maximum power outputs of the three interfaces. The configuration of the upper limit of the nominal range of the input power of the DC-DC converter corresponds at most to the sum of the maximum power outputs of the three interfaces.

Each of the three interfaces can be used to make available a maximum value of electric power to the DC-DC converter for charging the battery. This value is called the maximum output power of the interface. Each interface from the set of the three interfaces with the smallest maximum output power (or the smallest output power that is typically available during a charging operation, in the event of a deviation from the maximum output power) is relevant for the configuration of the DC-DC converter, because the value of this smallest maximum output power (or the smallest output power that is typically available) does not drop below the lower limit of the nominal range of the input power of the DC-DC converter. The configuration of the DC-DC converter according to this embodiment has the advantage that the charging device enables an energy efficient charging and the fastest possible charging of the energy storage device, if the charging is done separately over one of the three interfaces. Independently of which of the three interfaces is affected, the DC-DC converter works at an optimal operating point, which means with optimal efficiency. An optimal operating point is characterized by the fact that it lies within the nominal range of the input power of the DC-DC converter. In the event that the external charging infrastructure provides such a small amount of electric power or that the electric energy storage device has such a small charge acceptance that, during a separate charging operation over a single interface, a smaller amount of power than the maximum output power of this interface is fed to the DC-DC converter, then it may be quite likely that the DC-DC converter is working at an input power that is below its nominal range on the input side. However, this operating point is also in the operating range of the DC-DC converter, because the operating range of a DC-DC converter includes the power range below the nominal range.

The upper limit of the nominal range of the input power of the DC-DC converter corresponds, according to this embodiment, at most to the sum of the three maximum power outputs. If the upper limit of the nominal range of the input power of the DC-DC converter corresponds exactly to the sum of the three maximum power outputs, then it is ensured that the DC-DC converter is working at an optimal operating point, if the energy storage device is being charged simultaneously over all three interfaces, and the respective maximum output power is fed to the DC-DC converter over each of the three interfaces.

Preferably, the charging device is configured such that the electric energy storage device is designed for a maximum charging voltage of at most 1,000 volts. The first interface is designed for an effective value of the first external alternating voltage of at most 500 volts. The second interface is designed for a maximum induced voltage of at most 3,000 volts; and the third interface is designed for a maximum voltage of the external direct voltage source of at most 1,000 volts.

This embodiment has a special advantage. The charging device can be coupled via the first and the second interface with the most widely installed AC networks in the world (in particular, 1 phase grid systems at 50/60 Hertz up to 240 volts and 3 phase grid systems at 50/60 Hertz up to 480 volts) for charging the energy storage device. With respect to the electrical configuration, the charging device can be coupled via the third interface to both regulated and unregulated DC charging stations and/or also DC power grids and also directly to electric energy storage devices. This specific embodiment guarantees that the charging device exhibits a high compatibility with the external charging infrastructure that will most likely be available to the vehicle user and, as a result, ensures a high degree of charging efficiency. Not only the charging efficiency is included in the concept of charging efficiency, but also the charging power. A high charging efficiency at high charging power is reflected in a short charge time in order to load a defined amount of charge into the energy storage device. In this case a short charge time, i.e. a high charging efficiency, is extremely advantageous.

The invention is based on the considerations presented as follows.

The charging of the electric storage device in plug-in hybrids or electric vehicles is conventionally carried out conductively, i.e. hard-wired. To facilitate the charging operation for the customer, there is a move to develop methods for wireless energy transfer. This charging technique is referred to as inductive charging and is based on the fact that energy is transferred through a coil, which is embedded in the ground, to a second coil, which is mounted on the vehicle, by electromagnetic induction, for example.

In the case of conductive charging at an alternating current source, for example, at the standard home power mains connection, the charging current is rectified in the vehicle. The voltage is adapted to the charging voltage of the electric energy storage device. For this purpose an inter-vehicle charging device, which is constructed as an AC-DC converter, is used. The charging device consists, in highly simplified terms, of two components: a rectifier and a DC-DC converter.

Conductive charging can also take place at an external direct current source, for example, at a charging station. A DC-DC converter for voltage matching has to be provided in order to optimally charge the storage device.

In the case of inductive charging, a high frequency alternating voltage is generated at the coil in the vehicle. This high frequency alternating voltage is rectified near the coil, in order to reduce the electromagnetic radiation. Then, the voltage is changed, as a function of the inputs from the battery control unit, in a DC-DC converter.

In order to install together the conductive AC charging technique, the conductive DC charging technique and the inductive charging technique, a number of components are required, in addition to the respective systems for connecting components in the vehicle's electrical system. In over-simplified terms these components are an AC-DC converter with a DC-DC converter for the conductive AC charging technique, a DC-DC converter for the conductive DC charging technique and a coil with a rectifier and a DC-DC converter for the inductive charging technique. In particular, the three converters incur a high cost and require geometric installation space.

It is possible to achieve a significant simplification of the topology of the necessary electrical system of the vehicle and an effective cost-cutting by designing and dimensioning the DC-DC converter, which is used in the charging device for charging with the conductive AC charging technique, in such a way that the voltage conversion in the branch for the conductive DC charging technique and the voltage conversion in the branch for the inductive DC charging technique is also taken over at the same input of the DC-DC converter. The technical improvement of the DC-DC converter in the charging device is offset by the reduction of two additional DC-DC converters, a feature that is reflected in both a cost benefit and installation space advantage. In addition, a simplified cable harness can be used.

Other objects, advantages and novel features of the present invention will become apparent from the following detailed description of a preferred embodiment when considered in conjunction with the accompanying drawing.

BRIEF DESCRIPTION OF THE DRAWING

FIG. 1 is a schematic block diagram of a charging device for an electric energy storage device in a motor vehicle.

DETAILED DESCRIPTION OF THE DRAWING

FIG. 1 shows in schematic form the architecture of an automotive electrical system of an electric vehicle or a plug-in hybrid vehicle (1). An electric energy storage device (2) makes available electric power for the drive of the vehicle or for supplying power to consumers in the vehicle. The energy storage device (2) is implemented, for example, as a secondary high voltage battery in lithium ion technology and is designed for a maximum charging voltage of at most 1,000 volts. The charging of the battery (2) can be carried out in that electric power is transferred from an external power source or from external power sources into the vehicle. The charging of the energy storage device is carried out by way of a DC-DC converter (3) arranged upstream of the battery (2).

In order to be able to charge the battery from the outside, the architecture of the automotive electrical system has a first interface (4) to a first external AC network (voltage grid) (5). The first interface (4) is designed to be hard-wired, i.e. is constructed mechanically and electrically as a plug and socket connection between a first plug (10) and a first socket (11). The first interface is designed for an effective value of the first external alternating voltage of at most 500 volts. The alternating voltage from the first external AC network is rectified to a direct voltage by a first rectifier (12), which is arranged downstream of the first interface. Downstream of the first rectifier is a DC link capacitor (19) for smoothing the direct voltage. The smoothed direct voltage is applied to the input of the DC-DC converter (3).

A second charging interface (6) to a second external AC network (7) is based on the principle of electromagnetic induction. The second charging interface has a receiver coil (13), wherein an alternating voltage can be induced at the receiver coil by an external, energized exciter coil (14). The second external AC network (7) feeds the exciter coil. A matching operation of the grid voltage and the grid frequency of the second external AC network is conducted at the second interface by way of a voltage and frequency inverter (24). The first and the second charging interfaces can be fed from the same external AC network or from different AC networks. The alternating voltage, induced in the receiver coil (13) of the vehicle, drops off over a resonant circuit capacitor (15), which is connected in parallel to the receiver coil, and is rectified to a direct voltage by a downstream, second rectifier (16). This direct voltage can be smoothed by use of a downstream inductive component (23) and a DC link capacitor (20) and is applied to the input of the DC-DC converter. The second charging interface (6) is designed for a maximum induced voltage of at most 3,000 volts.

The energy storage device (2) can be charged at a DC charging station over a third interface (8) to an external direct current source (9). The third interface to the external DC power grid is implemented mechanically and electrically as a hard-wired plug and socket connection between a second plug (17) and a second socket (18). Owing to this plug connection, the external direct voltage is applied to the input of the DC-DC converter. The external direct voltage can be smoothed over a DC link capacitor (21) between the third interface and the input of the DC-DC converter. The third interface is designed for a maximum external direct voltage of at most 1,000 volts.

The charging device has charging electronics (22) for controlling and monitoring the battery charging operation. The charging electronics have a bi-directional data interface to the on-board data network of the motor vehicle (in particular, to the DC-DC converter and to the electric energy storage device), in order to exchange open loop control variables, closed loop control variables and monitoring variables of the electric energy storage device, the DC-DC converter and the three interfaces.

The first socket (11) and the second socket (18) are components of the motor vehicle. The first plug and the second plug are functional components of the first and second interfaces of the motor vehicle. Geometrically, each of the two plugs is connected to the external charging infrastructure by means of, for example, a charging cable. As an alternative, the first and the second interface can also be implemented by a cable connection in such a way that the plug and socket are designed interchangeably. In this case the two plugs with the respective charging cables are structural components of the motor vehicle; and the two sockets are components of the external charging infrastructure.

For example, the AC charging operation at the first external AC network can also be implemented in such a way that a charging cable, which is associated with the vehicle and has a first plug, which is constructed as a 3 prong grounded plug, is connected to the home power mains. The first plug can also be designed to be compatible with a so-called wall box, which can be connected to the home power mains. An AC charging station, which enables a higher charging power, and thus shorter charging times than the conventional home power mains, is called a wall box.

The charging device in FIG. 1 allows various charging modes of the energy storage device when the vehicle is in the stationary mode. Charging the battery over the first interface is referred to as AC charging. Charging the battery over the second interface is referred to as inductive charging. Charging the battery over the third interface is referred to as DC charging. The charging modes can be applied both separately and also combined in one charging operation. A suitable configuration of the DC-DC converter allows all combinations of the three charging modes to be applied during one charging operation. This includes the four additional charging modes: AC charging with simultaneous DC charging, AC charging with simultaneous inductive charging, DC charging with simultaneous inductive charging and AC charging with simultaneous DC charging and simultaneous inductive charging.

The suitable configuration of the DC-DC converter includes the configuration of the three interfaces and the electric energy storage device. Each of the three interfaces has a maximum output power owing to its configuration. The smallest of these three power outputs corresponds at least to the lower limit of the nominal range of the input power of the DC-DC converter. If the battery is charged separately at maximum power over an interface in one charging operation, then it is guaranteed that the DC-DC converter is operating at an optimal operating point, i.e. with low power loss and at high efficiency.

The upper limit of the nominal range of the input power of the DC-DC converter corresponds at most to the value of the sum of the three maximum power outputs of the three interfaces. A dimensioning of the DC-DC converter with the upper limit of the nominal range of its input power at the sum of the three maximum power outputs ensures that the DC-DC converter is being operated at an optimal working point, when the energy storage device is charged simultaneously over all three interfaces, and each of the three interfaces provides the maximum output power.

When the vehicle is moving, only the charging mode of inductive charging can be carried out, because the second interface is not designed to be hard-wired. The transfer of the charging power through electromagnetic induction allows a relative movement of the receiver coil with respect to the exciter coil. In order to charge the electric vehicle or the plug-in hybrid vehicle while the vehicle is moving, the exciter coil is constructed as a system of multiple coils. Between these coils and the receiver coil a maximum electromagnetic interaction occurs at different times during a charging operation.

LIST OF REFERENCE NUMERALS 1. motor vehicle
2. electric energy storage device
3. DC-DC converter
4. first hard-wired interface
5. first external AC network (voltage grid)
6. second inductive interface
7. second external AC network (voltage grid)
8. third hard-wired interface
9. external direct voltage source
10. first plug
11. first socket
12. first rectifier
13. receiver coil
14. exciter coil
15. resonant circuit capacitor
16. second rectifier
17. second plug
18. second socket
19. DC link capacitor
20. DC link capacitor
21. DC link capacitor
22. charging electronics
23. inductive component
24. voltage and frequency inverter The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charging device for an electric energy storage device of a motor vehicle, comprising:
    a DC-DC converter coupled to the electric energy storage device, wherein output power of the DC-DC converter provides charging power for the electric energy storage device;
    a first interface configured to be hard-wired to a first external AC network for charging the electric energy storage device;
    a second interface configured for inductive coupling with a second external AC network for charging the electric energy storage device; and
    a third interface configured to be hard-wired to an external direct voltage source for charging the electric energy storage device,
    wherein an input of the DC-DC converter is configured to be supplied with electric power over the third interface simultaneously with at least one of the first interface and the second interface, and
    wherein the DC-DC converter is configured to simultaneously receive a maximum power output from the third interface and a maximum power output from the at least one of the first interface and second interface, where the maximum power output from the third interface is different than the maximum power output from the at least one of the first interface and second interface.

2. The charging device according to claim 1, wherein the first, second and third interfaces each have a maximum power output; and
    wherein the DC-DC converter is configured such that:
    a lower limit of the nominal range of the input power of the DC-DC converter corresponds at least to a power constituting a lower power from a set of the maximum power outputs of the first, second and third interfaces; and
    an upper limit of the nominal range of the input power of the DC-DC converter corresponds at most to a sum of the maximum power outputs of the first, second and third interfaces.

3. The charging device according to claim 1, wherein:
    the electric energy storage device is configured for a maximum charge voltage of 1,000 volts;
    the first interface is configured for an effective alternating voltage of up to 500 volts;
    the second interface is configured for an inductive voltage of up to 3,000 volts; and
    the third interface is configured for a direct voltage of up to 1,000 volts.

* * * * *